United States Patent
Liu (10) Patent No.: US 11,443,021 B2
(45) Date of Patent: Sep. 13, 2022

(54) UNLOCKING PROCESSING METHOD AND DEVICE, AND COMPUTER STORAGE MEDIUM

(71) Applicant: BEIJING XIAOMI MOBILE SOFTWARE CO., LTD., Beijing (CN)

(72) Inventor: Nan Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 148 days.

(21) Appl. No.: 16/914,578

(22) Filed: Jun. 29, 2020

(65) Prior Publication Data

US 2021/0256101 A1 Aug. 19, 2021

(30) Foreign Application Priority Data

Feb. 13, 2020 (CN) .......................... 202010090921.7

(51) Int. Cl.
*G06K 9/00* (2022.01)
*G06F 21/32* (2013.01)
(Continued)

(52) U.S. Cl.
CPC .......... *G06F 21/32* (2013.01); *G06F 3/0443* (2019.05); *G06F 3/0446* (2019.05); *G06F 3/04883* (2013.01); *G06V 30/1423* (2022.01); *G09G 3/3611* (2013.01); *G06F 3/0485* (2013.01); *G06F 2221/2149* (2013.01)

(58) Field of Classification Search
CPC .......... G06F 31/16; G06F 21/32; G06F 3/041; G06F 3/0443; G06F 3/0446; G06F 3/0485; G06F 3/0486; G06F 3/0488; G06F 3/04883; G06F 9/54; G06F 2221/2149; G06K 9/00; G06K 9/20; G06K 9/62; G06K 9/68; H01L 27/32; G02B 3/00; H04N 5/232; G06V 30/1423; G09G 3/3611

See application file for complete search history.

(56) References Cited

U.S. PATENT DOCUMENTS

| 2015/0177884 | A1 | 6/2015 | Han |
| 2017/0091523 | A1 | 3/2017 | Chen et al. |

(Continued)

FOREIGN PATENT DOCUMENTS

| CN | 106022065 B | 6/2019 | |
| CN | 109960457 | * 7/2019 | ........... G06F 3/0484 |

(Continued)

OTHER PUBLICATIONS

European Search Report in the European application No. 20189163.7, dated Feb. 8, 2021.

*Primary Examiner* — Chanh D Nguyen
*Assistant Examiner* — Nguyen H Truong
(74) *Attorney, Agent, or Firm* — Syncoda LLC; Feng Ma (57) ABSTRACT

An unlocking processing method can be applied to a terminal, and include: in response to detecting a touch operation on a hot zone for a spot of the terminal, determining a direction of a signal generated by the touch operation among a plurality of directions; determining a threshold according to the direction, wherein at least two of the plurality of directions each corresponds to a respective different threshold; and reporting a request for lighting up the spot in the hot zone, in response to that a coverage of the signal exceeds the threshold.

20 Claims, 6 Drawing Sheets

(51) Int. Cl.
  *G06F 3/044* (2006.01)
  *G06F 3/04883* (2022.01)
  *G09G 3/36* (2006.01)
  *G06V 30/142* (2022.01)
  *G06F 3/0485* (2022.01)

(56) References Cited

U.S. PATENT DOCUMENTS

2017/0103253 A1* 4/2017 Pyun .................. G06K 9/00087
2021/0042403 A1* 2/2021 Zhou .................. G06K 9/00355

FOREIGN PATENT DOCUMENTS

CN  109960457 A  7/2019
EP  3151163 A1  4/2017

\* cited by examiner

UNLOCKING PROCESSING METHOD AND DEVICE, AND COMPUTER STORAGE MEDIUM

CROSS-REFERENCE TO RELATED APPLICATION

This application claims priority to Chinese Patent Application No. 202010090921.7 filed on Feb. 13, 2020, the disclosure of which is hereby incorporated by reference in its entirety.

BACKGROUND

With development of screen fingerprint technologies, unlocking by touching a screen with a finger has become one of unlocking modes supported by smart terminals. Generally, a screen fingerprint recognition relies on a prompt spot on the display screen.

SUMMARY

The disclosure relates to a fingerprint unlocking technology, and more specifically to an unlocking processing method and device, and a computer storage medium.

According to a first aspect of embodiments of the disclosure, provided is an unlocking processing method, applied to a terminal and including: in response to detecting a touch operation on a hot zone for a spot of the terminal, determining a direction of a signal generated by the touch operation among a plurality of directions; determining a threshold according to the direction, wherein at least two of the plurality of directions each corresponds to a respective different threshold; and reporting a request for lighting up the spot in the hot zone, in response to that a coverage of the signal exceeds the threshold.

According to a second aspect of the embodiments of the disclosure, provided is terminal, including: a processor, and memory configured to store executable instructions, wherein the processor is configured to: in response to detecting a touch operation on a hot zone for a spot of the terminal, determine a direction of a signal generated by the touch operation among a plurality of directions; determine a threshold according to the direction, wherein at least two of the plurality of directions each corresponds to a respective different threshold; and report a request for lighting up a spot in the hot zone in response to that a coverage of the signal exceeds the threshold.

According to a third aspect of the embodiments of the disclosure, provided is a computer storage medium, storing executable instructions which, when executed by a processor, cause the processor to perform an unlocking processing method, including: in response to detecting a touch operation on a hot zone for a spot of a terminal, determining a direction of a signal generated by the touch operation among a plurality of directions; determining a threshold according to the direction, wherein at least two of the plurality of directions each corresponds to a respective different threshold; and reporting a request for lighting up the spot in the hot zone, in response to that a coverage of the signal exceeds the threshold.

It should be understood that the above general description and the following detailed description are exemplary and explanatory only, and are not intended to limit the disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Exemplary embodiments (examples of which are illustrated in the accompanying drawings) are elaborated below. The following description refers to the accompanying drawings, in which identical or similar elements in two drawings are denoted by identical reference numerals unless indicated otherwise. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

The terms used in the embodiments of disclosure are for the purpose of describing the specific embodiments only and are not intended to limit the disclosure. The singular forms "a/an," "the" and "this" used in the embodiments of the disclosure and the appended claims are intended to include the plural forms, unless other meanings are clearly indicated in the context. It should also be understood that the term "and/or" as used herein refers to and includes any or all possible combinations of one or more associated listed items.

It should be understood that, although the terms "first," "second," "third" and so on may be used in the embodiments of the disclosure to describe various information, such information shall not be limited to these terms. These terms are used only to distinguish information of the same type from each other. For example, without departing from the scope of the embodiments of the disclosure, first information may also be referred to as second information. Similarly, second information may also be referred to as first information. Depending on the context, the word "if" as used herein may be explained as "when . . . ," "while" or "in response to determining."

When a user touches the prompt spot from different directions to trigger unlocking, the success rate of fingerprint unlocking may be low and the unlocking experience can be poor, due to a large difference in an area of the prompt spot covered by a finger.

Figure 1:
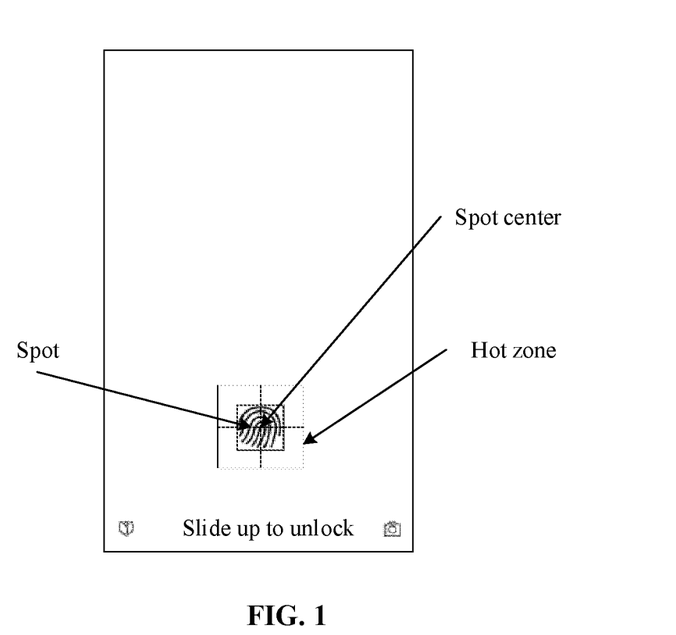
FIG. 1 illustrates a schematic diagram of positions of a spot and a hot zone for the spot according to some embodiments of the present disclosure.

Typically, under-screen fingerprint recognition refers to a process of triggering lighting up of a fingerprint on display (FOD) spot through a touch panel (TP), so that a fingerprint recognition module completes fingerprint acquisition, matching, and unlocking. The FOD spot is a demonstrative fingerprint spot lighten up on a screen-locked interface. The demonstrative fingerprint spot is usually circular. A circumscribing square is formed for the circular spot. An expanded square formed by expanding the circumscribing square by 20% (an adjustable proportion) is referred to as a hot zone for the FOD spot, specifically as illustrated in FIG. 1.

In a screen-off state of a terminal, the fingerprint recognition module does not work, and the touch panel (TP) is in an idle mode. When a touch panel (TP) chip detects a finger in the hot zone for the FOD spot and an area of the hot zone covered by the finger exceeds a certain percentage (such as 70%), the touch panel (TP) chip will send an FOD trigger request to an application processor (AP) end of the terminal. The AP is responsible for lighting up and rendering the spot, and wakes up the fingerprint recognition module to complete fingerprint recognition by the fingerprint recognition module.

In designs of triggering fingerprint unlocking by an FOD, a sensor is provided under a hot zone for a spot. The sensor includes a plurality of sensing nodes, each corresponding to a sensing region. All the sensing regions together form an entire sensing region corresponding to the sensor. The entire sensing region and the hot zone (the expanded square) for the spot usually do not completely overlap with each other.

Figure 2:
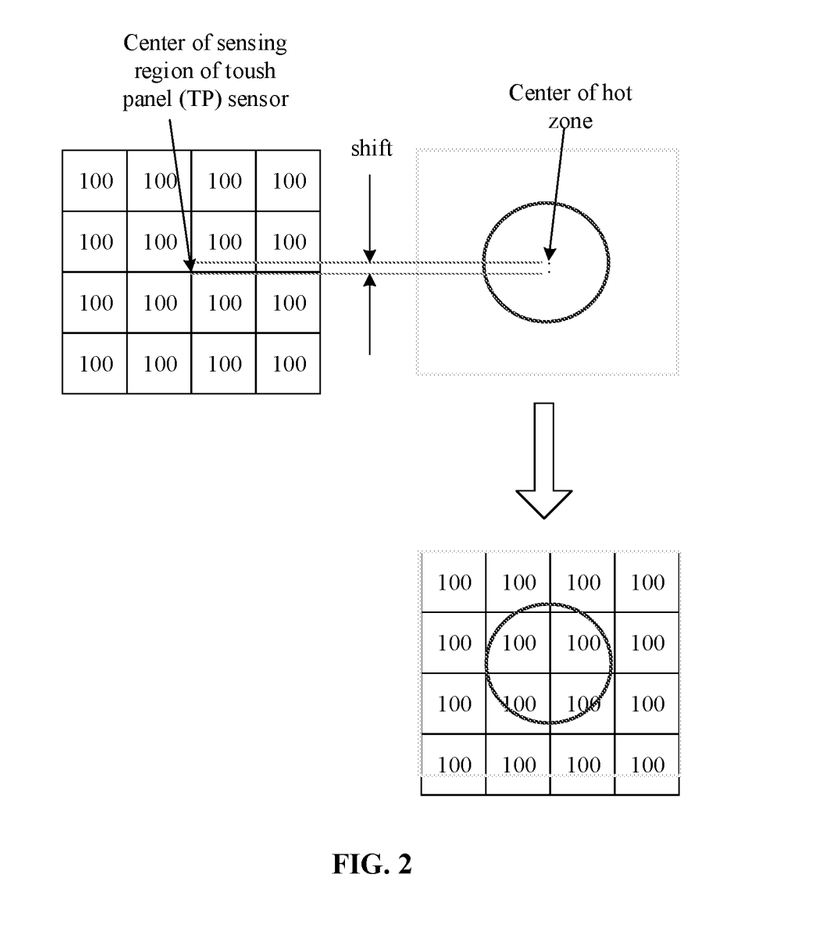
FIG. 2 illustrates a schematic diagram of a sensing region formed by a sensor not completely overlapped with a hot zone for a spot according to some embodiments of the present disclosure.

FIG. 2 illustrates a schematic diagram of an entire sensing region not completely overlapped with a hot zone for a spot. As can be seen from FIG. 2, the center of the hot zone for the spot is not completely overlapped with the center of the sensing region.

Typically, when x % (x is a touch area threshold) sensing nodes of a sensor generate signals, it is considered that x % of the hot zone for the spot is covered with a signal, and the touch panel (TP) chip will sends information to the AP.

However, directions in which an FOD spot is touched by a finger for unlocking are not distinguished from one another. The area of the FOD spot covered by the finger is greatly different when the finger touches the FOD spot from different directions. If a same touch area threshold (usually 60% to 70%) is used without distinguishing directions from which the finger touches the spot, a low success rate of fingerprint unlocking will be caused, and a user's unlocking experience would be affected.

Moreover, sensing regions corresponding to the hot zone for the spot have a same weight, which increases a difference in the area of the FOD spot covered by the finger when the finger touches the FOD spot from different directions for unlocking. The success rate of fingerprint unlocking is further decreased, seriously affecting the user's unlocking experience.

Figure 3:
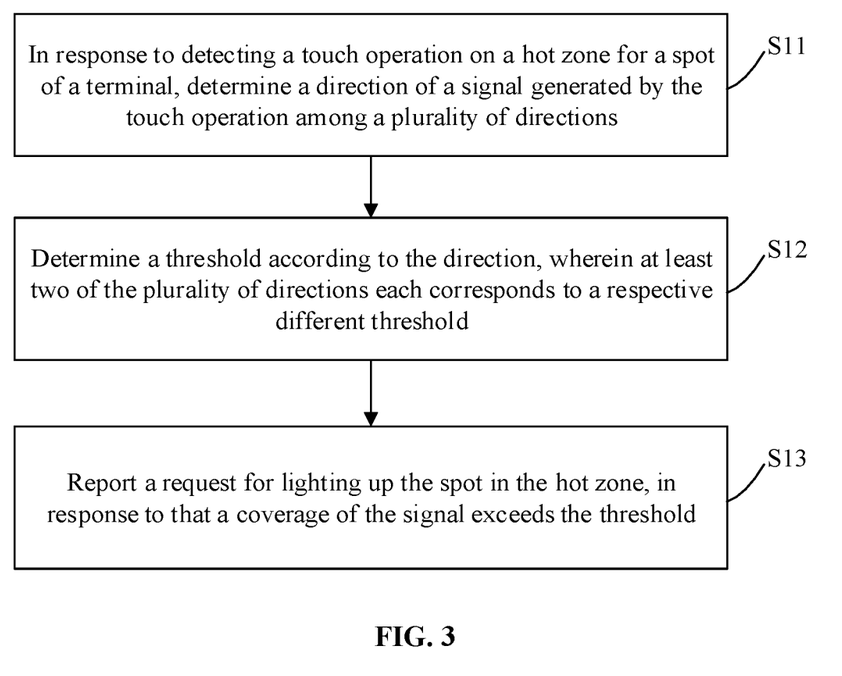
FIG. 3 illustrates a flowchart of an unlocking processing method according to some embodiments of the present disclosure.

FIG. 3 illustrates a flowchart of an unlocking processing method according to some embodiments of the present disclosure. As illustrated in FIG. 3, the unlocking processing method is applied to a terminal with a fingerprint unlocking function. These embodiments of the disclosure may be applied to various terminals, including but not limited to fixed terminals and mobile terminals. For example, the fixed terminals include, but are not limited to, personal computers (PCs), televisions, air conditioners, and wall-hanging stoves. The mobile terminals include but are not limited to mobile phones, tablet computers, wearable devices, sound boxes, and alarm clocks. The unlocking processing method includes the following blocks S11, S12 and S13.

In block S11, in response to detecting a touch operation on a hot zone for a spot of the terminal, a direction of a signal generated by the touch operation is determined among a plurality of directions.

In these embodiments, the hot zone for the spot refers to a zone formed by expanding the spot by a certain proportion and including the spot.

In embodiments of the disclosure, a sensor configured to acquire the signal is provided under the hot zone, and the sensor includes a plurality of sensing nodes, each corresponding to a sensing region.

In these embodiments, the touch operation is an operation, acquired by the sensor under the hot zone, of a user touching the hot zone.

In embodiments of the disclosure, the direction is used to reflect from which direction of the hot zone the user touches the hot zone. In some embodiments, the direction of the signal may be automatically determined by a touch panel (TP) chip.

In some embodiments, the operation that the direction of the signal generated by the touch operation is determined includes that: a coordinate position of a touch point is acquired based on the touch operation, a zone where the touch point is located is determined according to the coordinate position, and the direction of the signal is determined according to the zone where the touch point is located.

In some applications, all touch points on the touch panel (TP) is located in the same reference plane coordinate system.

It is to be noted that the hot zone is divided into at least a first zone, a second zone, a third zone, and a fourth zone. The first zone is an upper part of the hot zone. The second zone is a lower part of the hot zone. The third zone is a left part of the hot zone. The fourth zone is a right part of the hot zone.

In this way, when detecting a touch operation, a direction of a signal is determined at first. This helps providing a basis and data support for subsequent determination of a threshold.

In block S12, a threshold is determined according to the direction. At least two of the plurality of directions each corresponds to a respective different threshold.

In some embodiments, the operation that the threshold is determined according to the direction includes that: correspondences between preset directions and preset thresholds are acquired, and a preset threshold corresponding to the direction is determined as the threshold based on the correspondences.

In this way, it is convenient to determine the threshold matching with the direction, thereby helping balancing speeds of reporting a spot lighting-up request in all directions, and improving unlocking experience.

In some embodiments, the operation that the threshold is determined based on the direction includes: a first trigger threshold is determined to be the threshold when the direction is a first direction, and a second trigger threshold is determined to be the threshold when the direction is a second direction. The first trigger threshold is different from the second trigger threshold.

In this way, compared to uniformly using a same trigger threshold without distinguishing directions from which a finger touches a hot zone, a trigger threshold is determined according to a direction of a signal in the embodiments of the disclosure, which helps balancing response speeds of touch operations in all directions.

It is to be understood that in some applications, touching of the hot zone may be divided into a plurality of directions according to user needs or design requirements. The touch sensitivity corresponding to all directions are the same, or a difference between touch sensitivity corresponding to all directions is less than a preset difference value. The plurality of directions at least include a first direction and a second direction. The first direction and the second direction are opposite to each other.

In block S13, a request for lighting up the spot in the hot zone is reported, in response to that a coverage of the signal exceeds the threshold.

In some embodiments, the coverage is an area ratio. In particular, the coverage is a ratio of an area of sensing regions of sensing nodes, each generating a signal, to a reference area corresponding to the direction.

In some embodiments, the reference area may be a sum area of sensing regions of all sensing nodes in the corresponding direction. Of course, it may also be a maximum area of the sensing region formed by the sensor.

In some embodiments, the coverage of the signal is an area ratio. The operation that the request for lighting up the spot in the hot zone is reported in response to the coverage of the signal exceeds the threshold includes that: the request for lighting up the spot in the hot zone is reported in response to that a ratio of an area of a sensing region, in which a signal is generated, to a reference area in the corresponding direction exceeds an area threshold.

In this way, different thresholds are used for touch operations of touching the hot zone from different directions. The problem that a spot lighting-up request cannot be reported in a timely manner due to that the area of a hot zone for a spot covered by a finger is different can be avoided, and the unlocking experience of a user touching the hot zone from different directions can be improved.

In the above solution, the method further includes the following block S10.

In block S10 (not shown in FIG. 3), based on a positional relationship between the hot zone and the sensing region formed by the sensor, a threshold corresponding to each direction under the positional relationship is determined in advance. The threshold corresponding to the direction is different under different positional relationships.

In embodiments of the disclosure, the positional relationship includes at least one of the following: a positional relationship between the center of the hot zone and the center of the sensing region formed by the sensor; and a positional relationship between a symmetry axis of the hot zone and a symmetry axis of the sensing region formed by the sensor.

An example is given with reference to FIG. 2. The center of the hot zone is not overlapped with the center of the sensing region, and there is a certain shift therebetween. As can be seen from FIG. 2, the area of the hot zone is less than the area of the sensing region.

In some applications, the positional relationship between the hot zone on the touch panel (TP) and the sensing region formed by the sensor may be different, for touch panels (TPs) in different models.

In some embodiments, the operation that, based on the positional relationship between the hot zone and the sensing region formed by the sensor, the threshold corresponding to each direction under the positional relationship is determined in advance includes that: a reference threshold corresponding to each direction when a positional relationship between the hot zone and the sensing region is a reference positional relationship is taken as a reference, to adjust a threshold corresponding to the direction under an actual positional relationship between the hot zone and the sensing region.

In some embodiments, the reference threshold in each direction under the reference positional relationship is known for a system. A threshold corresponding to each direction may be adjusted for the terminal according to an actual positional relationship between the hot zone and the sensing region, with the reference threshold as a reference.

In this way, the terminal can be provided with a spot lighting-up trigger condition, matching the hot zone of the terminal, for fingerprint unlocking.

In various embodiments of the disclosure, in response to detecting a touch operation on a hot zone for a spot of a terminal, a direction of a signal generated by the touch operation is determined among a plurality of directions. A threshold is determined according to the direction. At least two of the plurality of directions each corresponds to a respective different threshold. In response to a coverage of the signal exceeding the threshold, a request for lighting up the spot in the hot zone is reported.

In this way, since thresholds corresponding to different directions may be different, a threshold is determined according to a direction of a signal generated by a touch operation, and then whether to report a request for lighting up a spot in a hot zone for the spot is determined according to the threshold corresponding to the direction. Compared to a low success rate of fingerprint unlocking caused by the fact that the same touch area threshold is used without distinguishing the direction from which a finger touching the hot zone, the problem of influence on the success rate of fingerprint unlocking caused by the following reason is solved: a spot lighting-up request cannot be reported in a timely manner due to different areas of the hot zone covered by a finger when the finger touches the hot zone from different directions to trigger unlocking. The success rate of fingerprint unlocking is increased, and the unlocking experience of a user is improved.

In the above solution, the request for lighting up the spot in the hot zone is reported by using different thresholds according to the directions of the signals generated by the touch operations, so that the success rate and recognition rate of fingerprint unlocking can be improved. In order to further improve the success rate and recognition rate of fingerprint unlocking, in some embodiments, the method further includes that a weight is set for each of the sensing nodes in advance. At least two of the sensing nodes each corresponds to a respective different weight.

In the above solution, among the sensing nodes, a sensing node closer to a center of the hot zone for the spot has a greater weight than a sensing node farther from the center of the hot zone (that is, an edge region of the hot zone).

In some embodiments, a reference value of 100 may be used. A product of a coefficient corresponding to a sensing node multiplied by the reference value is used as the weight of the sensing node. The coefficient is less than or equal to 1. In some embodiments, if a coefficient corresponding to a sensing node 1 is 0.56, a weight of the sensing node 1 is 100×0.56=56. If a coefficient corresponding to a sensing node 2 is 0.8, a weight of the sensing node 2 is 100×0.8=80. If a coefficient corresponding to a sensing node 3 is 1, a weight of the sensing node 3 is 100×1=100.

It is to be noted that when assigning a weight to each sensing node, the reference value may be set or adjusted according to design requirements such as a calculation speed. For example, the reference value may also be 1. In some embodiments, 1 is used as a reference value. If the coefficient corresponding to the sensing node 1 is 0.56, the weight of the sensing node 1 is 1×0.56=0.56. If the coefficient corresponding to the sensing node 2 is 0.8, the weight of the sensing node 2 is 1×0.8=0.80. If the coefficient corresponding to the sensing node 3 is 1, the weight of the sensing node 3 is 1×1=1.

In this way, with respect to using a same weight for different sensing regions or sensing nodes, presetting a weight for each of the sensing regions or the sensing nodes helps to reduce the difference in the area of the hot zone covered by a finger when the finger touches the hot zone from different directions to trigger unlocking. Thus, the success rate and recognition rate of fingerprint unlocking are further increased, and the unlocking experience of a user is improved.

As the areas of the sensing regions corresponding to all sensing nodes are the same or slightly-different, the areas of the sensing regions corresponding to the sensing nodes may be ignored when reporting the request for lighting up the spot in the hot zone, and only the weights of the sensing nodes that generate the signals are taken into consideration.

In some embodiments, the coverage is a weight ratio, and the threshold is a weight threshold. The operation that the request for lighting up the spot in the hot zone is reported in response to that the coverage of the signal exceeds the threshold includes that: the request for lighting up the spot in the hot zone is reported, in response to that a ratio of a sum of weights of M sensing nodes, each generating a signal with an intensity greater than an intensity threshold, among N sensing nodes to a reference weight corresponding to the direction exceeds a first threshold. Both N and M are positive integers, and M is less than N.

In some embodiments, the first weight threshold may be different for different directions.

Description is made with reference to FIG. 4 hereinafter. The sensor includes 16 sensing nodes, each corresponding to an independent sensing region. The sensing regions corresponding to all the sensing nodes constitute an entire sensing region of the sensor. The weights of a first row of the sensing nodes from left to right are 56, 100, 100, and 56, respectively. The weights of a second row of the sensing nodes from left to right are 80, 100, 100, and 80, respectively. The weights of a third row of the sensing nodes from left to right are 80, 100, 100, and 80, respectively. The weights of a fourth row of the sensing nodes from left to right are 48, 60, 60 and 48, respectively.

Figure 4:
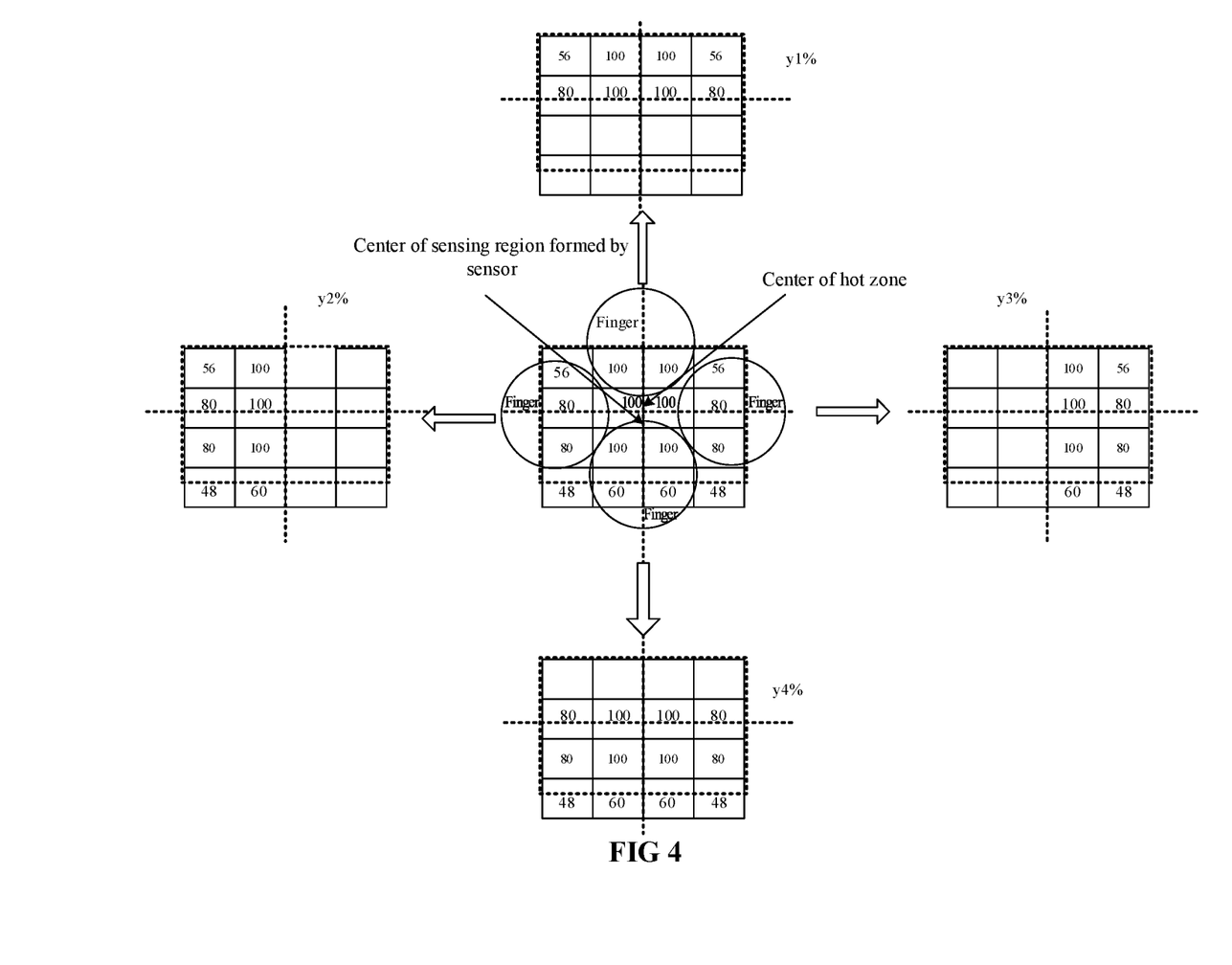
FIG. 4 illustrates a schematic diagram of weights of different sensing nodes of a sensor according to some embodiments of the present disclosure.

For a circle identified as a finger in the left part of FIG. 4, the finger covers four sensing nodes with weights of 56, 80, 80, and 100, respectively. The intensity of a signal generated by the sensing node with the weight of 100 may be less than an intensity threshold. Therefore, when analyzing a coverage of the signals, the sensing node may be ignored. If (56+80+80)/K1 exceeds the first weight threshold, it is determined that a reporting condition is satisfied. K1 is a reference weight in this direction. For example, K1=56+80+80+100=316. For example, the first weight threshold is 55%.

For a circle identified as a finger in the upper part of FIG. 4, the finger covers four sensing nodes with weights of 100, 100, 100, and 100, respectively. The intensities of signals generated by lower two sensing nodes among the four sensing nodes may be less than an intensity threshold. Therefore, when analyzing a coverage of the signals, the lower two sensing nodes may be ignored. If (100+100)/K2 exceeds the first weight threshold, it is determined that a reporting condition is satisfied. K2 is a reference weight in this direction. For example, K2=100+100+100+100=400. For example, the first weight threshold is 45%.

In some embodiments, the intensity threshold may be determined according to user needs or design requirements.

In some applications, when a finger touches the hot zone, there may be a plurality of sensing nodes generating signals, but the intensities of signals generated by different sensing nodes are different. When determining whether the reporting trigger condition is satisfied, only the weight of a sensing node generating a signal with an intensity exceeding the intensity threshold may need to be analyzed. Judgement of the trigger condition realized without analyzing all the sensing nodes touched by the finger.

In some embodiments, the coverage is a weight ratio, and the threshold is a weight threshold. The operation that the request for lighting up the spot in the hot zone is reported in response to that the coverage of the signal exceeds the threshold includes that: the request for lighting up the spot in the hot zone is reported, in response to that a ratio of a sum of weights of P sensing nodes, each generating a signal, among N sensing nodes to a reference weight corresponding to the direction exceeds a second threshold. N and P are both positive integers. P is less than N and greater than or equal to M. M represents the number of sensing nodes each generating a signal with an intensity greater than an intensity threshold.

In some embodiments, the second weight threshold may be different for different directions.

Description is made with reference to FIG. 4 again. For a circle identified as a finger in the left part of FIG. 4, the finger covers four sensing nodes with weights of 56, 80, 80, and 100, respectively. When analyzing a coverage of signals, all the sensing nodes covered by the finger are taken into consideration. If (56+80+80+100)/K3 exceeds the second weight threshold, it is determined that a reporting condition is satisfied. K3 is a reference weight in this direction. For example, K3=56+80+80+100+100+100+48+60=624. For example, the second weight threshold is 50%.

For a circle identified as a finger in the upper part of FIG. 4, the finger covers four sensing nodes with weights of 100, 100, 100, and 100, respectively. When analyzing a coverage of signals, all the sensing nodes covered by the finger are taken into consideration. That is, if (100+100+100+100)/K4 exceeds the second weight threshold, it is determined that a reporting condition is satisfied. K4 is a reference weight in this direction. For example, K4=100+100+100+100+80+80+56+56=672. For example, the second weight threshold is 55%.

In some applications, when a finger touches the hot zone, signals may be generated by a plurality of sensing nodes, but the intensities of signals generated by different sensing nodes are different. When determining whether the reporting trigger condition is satisfied, the trigger condition may be judged by analyzing the weights of all the sensing nodes that generate signals.

In some embodiments, the coverage is an area ratio, and the threshold is an area threshold. The operation that the request for lighting up the spot in the hot zone is reported in response to that the coverage of the signal exceeds the threshold includes that: the request for lighting up the spot in the hot zone is reported, in response to that a ratio of a sum of products of areas of sensing regions of M sensing nodes, each generating a signal with an intensity greater than an intensity threshold, among N sensing nodes multiplied by respective weights to a reference area corresponding to the direction exceeds a third threshold. Both N and M are positive integers, and M is less than N.

It is to be noted that the first area threshold may be different for different direction.

Description is made with reference to FIG. 4 again. For a circle identified as a finger in the left part of FIG. 4, the finger covers four sensing nodes, respectively denoted as a sensing node 1, a sensing node 2, a sensing node 3, and a sensing node 4, with weights of 56, 80, 80, and 100, respectively. The intensity of a signal generated by the sensing node 4 with the weight of 100 may be less than an intensity threshold. Therefore, when analyzing a coverage of signals, the sensing node 4 may be ignored.

If (S1×56+S2×80+S3×80)/((56+80+80+100)S0) exceeds a first area threshold, then it can be determined that the reporting condition is satisfied. Wherein sensing area S1 of sensing node 1 has a weight of 56, sensing area S2 of sensing node 2 has a weight of 80, sensing area S3 of sensing node 3 has a weight of 80, (56+80+80+100)S0 is a reference area in this direction, and S0 is an average of preset maximum areas of sensing regions of all sensing nodes. For example, the first area threshold is 50%.

For a circle identified as a finger in the upper part of FIG. 4, the finger covers four sensing nodes, respectively denoted as a sensing node 4, a sensing node 5, a sensing node 6, and a sensing node 7, with weights of 100, 100, 100, and 100, respectively. The intensities of signals generated by lower sensing nodes 4 and 5 among the four sensing nodes may be less than an intensity threshold. Therefore, when analyzing a coverage of signals, the lower two sensing nodes may be ignored.

If the sum of products of sensing areas of the sensing nodes 6 and 7, each generating a signal with an intensity greater than the intensity threshold, multiplied by the respective weights thereof, i.e., (S6×100+S7×100)/((100+100+100+100)S0) exceeds a first area threshold, it can be determined that the reporting condition is satisfied. Wherein, (100+100+100+100)S0 is a reference area in this direction, and S0 is an average of preset maximum areas of sensing regions of all sensing nodes. For example, the first area threshold is 54%.

In some applications, when a finger touches the hot zone, signals may be generated by a plurality of sensing nodes, but the intensities of signals generated by different sensing nodes are different. When determining whether the reporting trigger condition is satisfied, only the weight and area of a sensing node generating a signal with an intensity exceeding the intensity threshold may need to be analyzed. The trigger condition may be judged without analyzing all the sensing nodes generating signals.

In some embodiments, the coverage is an area ratio, and the threshold is an area threshold. The operation that the request for lighting up the spot in the hot zone is reported in response to that the coverage of the signal exceeding the threshold includes that: the request for lighting up the spot in the hot zone is reported, in response to that a ratio of a sum of products of areas of sensing regions of P sensing nodes, each generating a signal, among N sensing nodes multiplied by respective weights to the reference area corresponding to the direction exceeds a fourth threshold. N and P are both positive integers. P is less than N and greater than or equal to M. M represents the number of sensing nodes each generating a signal with an intensity greater than an intensity threshold.

In some embodiments, the second area threshold may be different for different directions.

Description is made with reference to FIG. 4 again. For a circle identified as a finger in the left part of FIG. 4, the finger covers four sensing nodes, respectively denoted as a sensing node 1, a sensing node 2, a sensing node 3, and a sensing node 4, with weights of 56, 80, 80, and 100, respectively. When analyzing a coverage of signals, all the sensing nodes that generate signals are taken into consideration. It can be determined that the reporting condition is satisfied, when (S1×56+S2×80+S3×80+S4×100)/(56+(80+80+100+100+100+48+60)S0) exceeds a first area threshold. Wherein sensing area S1 of sensing node 1 has a weight of 56, sensing area S2 of sensing node 2 has a weight of 80, sensing area S3 of sensing node 3 has weight of 80, sensing area S4 of sensing node 4 has weight of 100, (56+80+80+100+100+100+48+60)S0 is a reference area in this direction, and S0 is an average of preset maximum areas of sensing regions of all sensing nodes. For example, the second area threshold is 50%.

For a circle identified as a finger in the upper part of FIG. 4, the finger covers four sensing nodes, respectively denoted as a sensing node 4, a sensing node 5, a sensing node 6, and a sensing node 7 with weights of 100, 100, 100, and 100, respectively. When analyzing a coverage of signals, all the sensing nodes that generate signals may be considered. The sum of products of sensing areas of the sensing nodes 4, 5, 6, and 7, each generating a signal with an intensity greater than an intensity threshold, multiplied by the respective weights thereof (S4×100+S5×100+S6×100+S7×100)/((100+100+100+100+80+80+56+56)S0) exceeds a first area threshold, it can be determined that the reporting condition is satisfied. Wherein, (100+100+100+100+80+80+56+56)S0 is a reference area in this direction, and S0 is an average of preset maximum areas of sensing regions of all sensing nodes. For example, the second area threshold is 52%.

In some applications, when a finger touches the hot zone, signals may be generated by a plurality of sensing nodes, but the intensities of signals generated by different sensing nodes are different. When determining whether the reporting trigger condition is satisfied, the trigger condition may be judged by analyzing the weights and sensing areas of all the sensing nodes generating signals.

In the technical solution of the embodiments of the disclosure, thresholds corresponding to different directions are different, and weights of different sensing regions or sensing nodes are different. A threshold is determined by analyzing a direction of a signal generated by a touch operation, and a coverage of the signal is determined according to weights. The speed at which a touch panel (TP) reports a spot lighting-up request when a hot zone for a spot is touched from different directions can be balanced and improved. This helps to increase the success rate and recognition rate of fingerprint unlocking, and improve the unlocking experience of a user.

FIG. 4 illustrates a schematic diagram of weights of different sensing nodes of a sensor according to some embodiments of the present disclosure.

As can be seen from FIG. 4, with respect to the hot zone, there may be at least four directions of signals, including above, below, left, and right. The hot zone is not completely overlapped with the sensing region. The sensor includes 16 sensing nodes, each corresponding to an independent sensing region. The sensing regions corresponding to all sensing nodes constitute an entire sensing region of the sensor. The weights of a first row of the sensing nodes from left to right are 56, 100, 100, and 56, respectively. The weights of a second row of the sensing nodes from left to right are 80, 100, 100, and 80, respectively. The weights of a third row of the sensing nodes from left to right are 80, 100, 100, and 80, respectively. The weights of a fourth row of the sensing nodes from left to right are 48, 60, 60 and 48, respectively.

For example, a threshold is an area threshold. When a finger touches the spot from above the hot zone, for unlocking, the area threshold of triggering request reporting is y1%. When the finger touches the spot from below the hot zone, for unlocking, the area threshold of triggering request reporting is y4%. When the finger touches the spot from the left of the hot zone, for unlocking, the area threshold of triggering request reporting is y2%. When the finger touches the spot from the right of the hot zone, for unlocking, the area threshold of triggering request reporting is y3%. In some embodiments, y1<y2<y4, and y2=y3.

Specifically, the case where an area threshold for triggering request reporting is y1% when a finger touches, for unlocking, a spot from above the hot zone is taken as an example. Without considering the weights, a spot lighting-up request is reported, if the following percentage exceeds the area threshold y1%. The percentage is a percentage occupied in the area of the entire sensing region, by the sum of areas of the sensing regions where effective signals are generated when the finger touches the spot from above the hot zone for unlocking. When weights are considered, a spot lighting-up request is reported, if the sum of products of areas of sensing regions, where effective signals are generated, multiplied by respective weights of sensing nodes corresponding to the sensing regions exceeds the area threshold y1%.

It should be noted that the area threshold y1% is different in size in the case of considering the weight and not considering the weight.

It should be understood that each direction and the weight of each sensing node illustrated in FIG. 4 are optional specific implementations, but the disclosure is not limited thereto.

It should also be understood that each direction and the weight of each sensing node illustrated in FIG. 4 are only for exemplifying the embodiments of the disclosure. Technical solutions obtained by those skilled in the art by making obvious changes and/or replacements based on the example of FIG. 4 still fall within the disclosed scope of the embodiments of the disclosure.

Figure 5:
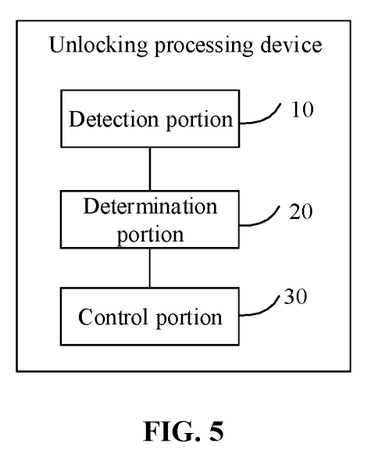
FIG. 5 illustrates a block diagram of an unlocking processing device according to some embodiments of the present disclosure.

FIG. 5 illustrates a block diagram of an unlocking processing device according to some embodiments of the present disclosure. The unlocking processing device is applied to a terminal. Referring to FIG. 5, the device includes a detection portion 10, a determination portion 20, and a control portion 30.

The detection portion 10 is configured to: in response to detecting a touch operation on a hot zone for a spot of the terminal, determine a direction of a signal generated by the touch operation among a plurality of directions.

The determination portion 20 is configured to determine a threshold according to the direction. At least two of the plurality of directions each corresponds to a respective different threshold.

The control portion 30 is configured to report a request for lighting up the spot in the hot zone, in response to that a coverage of the signal exceeds the threshold.

In the above solution, a sensor configured to acquire the signal is provided under the hot zone, and the sensor includes N sensing nodes, each corresponding to a sensing region, N being a positive integer.

In some embodiments, the determination portion 20 is further configured to: set a weight for each of the sensing nodes. At least two of the sensing nodes each corresponds to a respective different weight.

In some embodiments, among the N sensing nodes, a sensing node closer to a center of the hot zone for the spot has a greater weight.

In some embodiments, the control portion 30 is configured to: report the request for lighting up the spot in the hot zone, in response to that a ratio of a sum of weights of M sensing nodes, each generating a signal with an intensity greater than an intensity threshold, among the N sensing nodes to a reference weight corresponding to the direction exceeds a first threshold. Both N and M are positive integers, and M is less than N. In some embodiments, the control portion 30 is configured to: report the request for lighting up the spot in the hot zone, in response to that a ratio of a sum of weights of P sensing nodes, each generating a signal, among the N sensing nodes to the reference weight corresponding to the direction exceeds a second threshold. P is a positive integer less than N and greater than or equal to M.

In some embodiments, the control portion 30 is configured to: report the request for lighting up the spot in the hot zone, in response to that a ratio of a sum of products of areas of sensing regions of M sensing nodes, each generating a signal with an intensity greater than an intensity threshold, among the N sensing nodes multiplied by respective weights to a reference area corresponding to the direction exceeds a third threshold. Both N and M are positive integers, and M is less than N. In some embodiments, the control portion 30 is configured to: report the request for lighting up the spot in the hot zone, in response to that a ratio of a sum of products of areas of sensing regions of P sensing nodes, each generating a signal, among the N sensing nodes multiplied by respective weights to the reference area corresponding to the direction exceeds a fourth threshold. P is a positive integer less than N and greater than or equal to M.

With regard to the device in the above embodiments, the specific manner in which the respective portions perform the operations has been described in detail in these embodiments relating to the method, and will not be explained in detail herein.

In some applications, specific structures of the detection portion 10, the determination portion 20, and the control portion 30 may be implemented by the unlocking processing device, or a central processing unit (CPU), a micro controller unit (MCU), a digital signal processor (DSP), a programmable logic controller (PLC) or the like in a terminal to which the unlocking processing device belongs.

The unlocking processing device in some embodiments may be arranged in a terminal with a touch panel (TP).

Those skilled in the art should understand that the functions of processing portions in the unlocking processing device according to these embodiments of the disclosure may be understood by referring to the relevant description of the foregoing unlocking processing method. Each processing portion in the unlocking processing device according to these embodiments of the disclosure may be implemented by an analog circuit that implements the functions in some embodiments of the disclosure, and may also be implemented by software that executes the functions in some embodiments of the disclosure and runs on a smart terminal.

The unlocking processing device in these embodiments of the disclosure can effectively improve the success rate of fingerprint unlocking and the degree of recognition.

Also disclosed in embodiments of the disclosure is an unlocking processing device. The device includes: a memory, a processor, and a computer program that is stored on the memory and runs on the processor. The processor, when executing the program, implements the unlocking processing method provided in any one of the foregoing technical solutions applied to a terminal.

As an implementation, when executing the program, the processor implements: in response to detecting a touch operation on a hot zone for a spot of the terminal, determining a direction of a signal generated by the touch operation; determining a threshold according to the direction, with the threshold corresponding to the direction being different from at least a threshold corresponding to one other direction; and reporting a request for lighting up the spot in the hot zone, in response to that a coverage of the signal exceeding the threshold.

In the above solution, a sensor configured to acquire the signal is provided under the hot zone, and the sensor includes N sensing nodes, each corresponding to a sensing region, N being a positive integer.

As an implementation, when executing the program, the processor implements: setting a weight for each of the sensing nodes. At least two of the sensing nodes each corresponds to a respective different weight.

In the above solution, among the N sensing nodes, a sensing node closer to a center of the hot zone for the spot has a greater weight.

As an implementation, when executing the program, the processor implements: reporting the request for lighting up the spot in the hot zone, in response to that a ratio of a sum of weights of M sensing nodes, each generating a signal with an intensity greater than an intensity threshold, among the N sensing nodes to a reference weight corresponding to the direction exceeds a first threshold. Both N and M are positive integers, and M is less than N.

As an implementation, when executing the program, the processor implements: reporting the request for lighting up the spot in the hot zone, in response to that a ratio of a sum of weights of P sensing nodes, each generating a signal, among the N sensing nodes to the reference weight corresponding to the direction exceeds a second threshold. P is a positive integer less than N and greater than or equal to M.

As an implementation, when executing the program, the processor implements: reporting the request for lighting up the spot in the hot zone, in response to that a ratio of a sum of products of areas of sensing regions of M sensing nodes, each generating a signal with an intensity greater than an intensity threshold, among the N sensing nodes multiplied by respective weights to a reference area corresponding to the direction exceeds a third threshold. Both N and M are positive integers, and M is less than N.

As an implementation, when executing the program, the processor implements: reporting the request for lighting up the spot in the hot zone, in response to that a ratio of a sum of products of areas of sensing regions of P sensing nodes, each generating a signal, among the N sensing nodes multiplied by respective weights to the reference area corresponding to the direction exceeds a fourth threshold. P is a positive integer less than N and greater than or equal to M.

The unlocking processing device provided in these embodiments of the present application can effectively optimize the success rate of fingerprint unlocking and the degree of recognition.

In some embodiments of the present application, also disclosed is a computer storage medium with computer-executable instructions stored thereon. The computer-executable instructions are used to perform the unlocking processing method in each of the foregoing embodiments. That is to say, the computer-executable instructions, after being executed by a processor, can realize the unlocking processing method provided in any one of the foregoing technical solutions applied to a smart terminal.

Those skilled in the art should understand that the functions of the program in the computer storage medium according to these embodiments may be understood by referring to the relevant description of the unlocking processing method applied to the smart terminal described in each of the foregoing embodiments.

Figure 6:
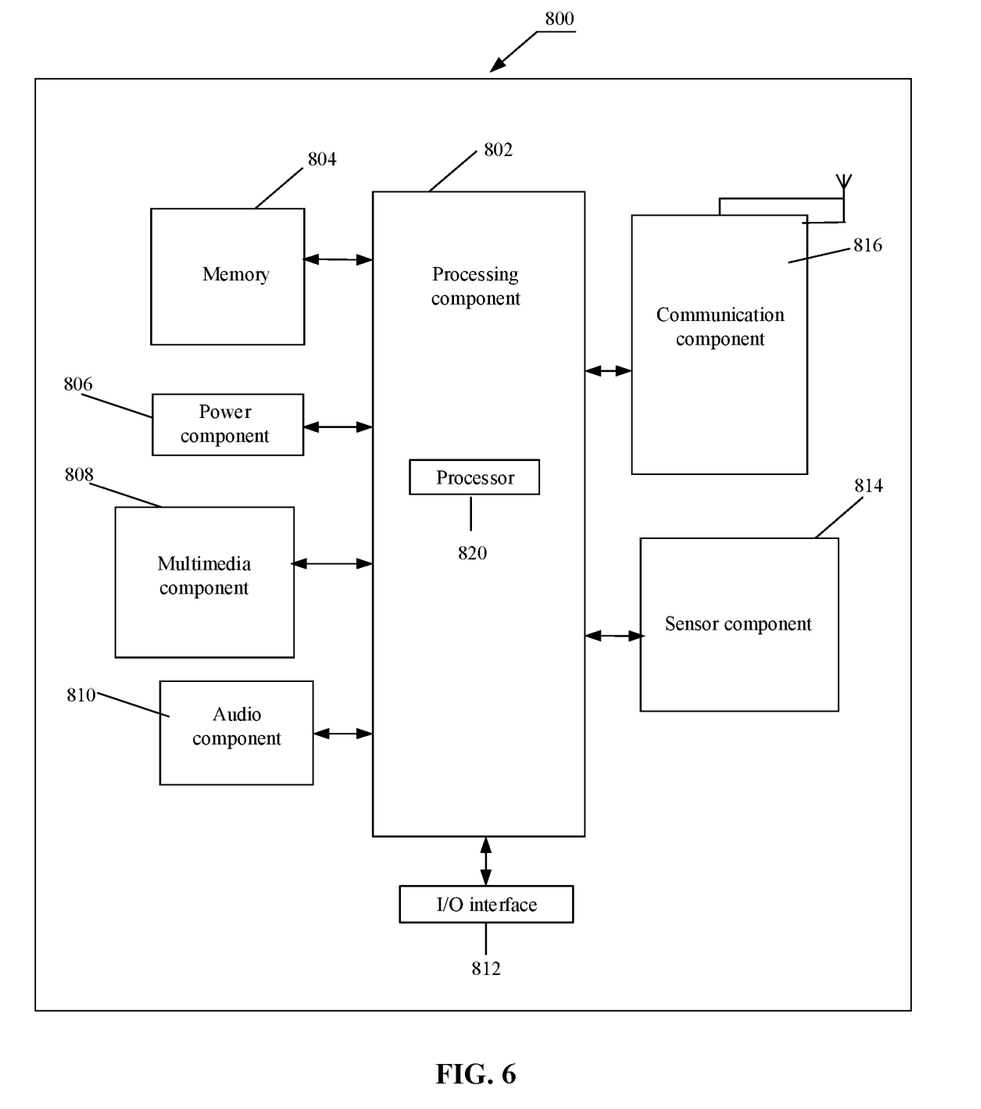
FIG. 6 illustrates a block diagram of a device 800 for implementing unlocking processing according to some embodiments of the present disclosure.

FIG. 6 illustrates a block diagram of a device 800 implementing unlocking processing, according to some embodiments of the present disclosure. For example, the device 800 may be a mobile phone, a computer, a digital broadcast terminal, a messaging device, a gaming console, a tablet, medical equipment, exercise equipment, a personal digital assistant, or the like.

Referring to FIG. 6, the device 800 may include one or more components: a processing component 802, a memory 804, a power component 806, a multimedia component 808, an audio component 810, an input/output (I/O) interface 812, a sensor component 814, and a communication component 816.

The processing component 802 generally controls the overall operation of the device 800, such as operations associated with display, telephone call, data communication, camera operation and recording operation. The processing component 802 may include one or more processors 820 to execute instructions to complete all or some of the blocks of the method described above. In addition, the processing component 802 may include one or more modules to facilitate the interaction between the processing component 802 and other components. For example, the processing component 802 may include a multimedia module to facilitate the interaction between the multimedia component 808 and the processing component 802.

The memory 804 is configured to store various types of data to support the operation on the device 800. Examples of the data include instructions of any application or method operating on the device 800, contact data, phonebook data, messages, pictures, videos, and the like. The memory 804 may be implemented using any type of volatile or non-volatile memory devices, or a combination thereof, such as an electrically-erasable programmable read-only memory (EEPROM), an erasable programmable read only memory (EPROM), a programmable read-only memory (PROM), a read-only memory (ROM), a magnetic memory, a flash memory, a magnetic disk or an optical disk.

The power component 806 provides power for various components of the device 800. The power component 806 may include a power management system, one or more power sources, and any other components associated with the generation, management, and distribution of power for the device 800.

The multimedia component 808 includes a screen providing an output interface between the device 800 and a user. In some embodiments, the screen may include a liquid crystal display (LCD) and a touch panel. In some embodiments, organic light-emitting diode (OLED) or other types of displays can be employed. If including a touch panel, the screen may be implemented as a touch screen to receive an input signal from a user. The touch panel includes one or more touch sensors to sense touch, sliding, and gestures on the touch panel. The touch sensor may not only sense a boundary of a touch or sliding action, but also can detect duration and pressure related to the touch or sliding operation.

In some embodiments, the multimedia component 808 includes a front camera and/or a rear camera. When the device 800 is in an operation mode, such as a shooting mode or a video mode, the front camera and/or the rear camera can receive external multimedia data. Each front camera and each rear camera may be a fixed optical lens system or may have a focal length and an optical zoom capability.

The audio component 810 is configured to output and/or input audio signals. For example, the audio component 810 includes a microphone (MIC) configured to receive external audio signals when the device 800 is in an operation mode, such as a call mode, a recording mode and a voice recognition mode. The received audio signals may be further stored in the memory 804 or sent via the communication component 816. In some embodiments, the audio component 810 further includes a speaker for outputting audio signals.

The I/O interface 812 provides an interface between the processing component 802 and a peripheral interface module. The peripheral interface module may be a keyboard, a click wheel, buttons, etc. These buttons may include, but not limited to: a home button, a volume button, a start button, and a lock button.

The sensor component 814 includes one or more sensors for providing state evaluation for the device 800 in various aspects. For example, the sensor component 814 can detect an on/off state of the device 800, and the relative positioning of components, such as a display and keypad of the device 800. The sensor component 814 may also detect a position change of the device 800 or one component of the device 800, existence or nonexistence of the user's contact with the device 800, orientation or acceleration/deceleration of the device 800, and a temperature change of the device 800. The sensor component 814 may include a proximity sensor configured to detect the existence of a proximate object without any physical contact. The sensor component 814 may further include a light sensor, such as a complementary metal oxide semiconductor (CMOS) or charge-coupled device (CCD) image sensor, for use in imaging applications. In some embodiments, the sensor component 814 may also include an acceleration sensor, a gyroscope sensor, a magnetic sensor, a pressure sensor, or a temperature sensor.

The communication component 816 is configured to facilitate communication, wired or wirelessly, between the device 800 and other devices. The device 800 may access communication standard based wireless networks, such as Wi-Fi, 2G, 3G, 4G, 5G or a combination thereof. In some embodiments, the communication component 816 receives broadcast signals or broadcast related information from an external broadcast management system via a broadcast channel. In some embodiments, the communication component 816 further includes an NFC module to facilitate short-range communications. For example, the NFC module may be implemented based on a radio frequency identification (RFID) technology, an infrared data association (IrDA), an ultra-wide band (UWB) technology, a Bluetooth (BT) technology and other technologies.

In some embodiments, the device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic elements, for performing the above unlocking processing method.

In some embodiments, also provided is a non-transitory computer storage medium including executable instructions, such as the memory 804 including executable instructions, which may be executed by the processor 820 of the device 800 to complete the method. For example, the non-transitory computer storage medium may be an ROM, a CD-ROM, a magnetic tape, a floppy disk, an optical data storage device, and the like.

The technical solutions provided by these embodiments of the disclosure have the following advantages:

In the disclosure, in response to detecting a touch operation on a hot zone for a spot of a terminal, a direction of a signal generated by the touch operation is determined among a plurality of directions. A threshold is determined according to the direction. At least two of the plurality of directions each corresponds to a respective different threshold. In response to that a coverage of the signal exceeds the threshold, a request for lighting up the spot in the hot zone is reported. In this way, since thresholds corresponding to different directions may be different, a threshold is determined according to a direction of a signal generated by a touch operation, and then whether to report a request for lighting up a spot in a hot zone is determined according to the threshold corresponding to the direction. The problem of a low success rate of fingerprint unlocking caused due to a single fixed threshold when touching a hot zone for a spot from different directions to trigger unlocking is solved. Thus, the success rate of fingerprint unlocking is increased, and the use experience of a user is improved.

In the disclosure, a threshold for reporting a spot lighting-up request is determined based on a direction of a signal generated by a touch operation. The unlocking speeds in all directions may be the same or slightly different, so that a user feels more stable unlocking experience.

The various device components, modules, units, blocks, or portions may have modular configurations, or are composed of discrete components, but nonetheless can be referred to as "modules" in general. In other words, the "components," modules," "blocks," "portions," or "units" referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. An unlocking processing method, executed by a terminal and comprising:
    in response to detecting a touch operation on a hot zone for a spot of the terminal, determining a direction of a signal generated by the touch operation among a plurality of directions, wherein the direction of the signal corresponds to a direction in which a fingerprint on display (FOD) spot is touched by a finger, and the plurality of directions comprise above, below, left and right;
    determining a threshold according to the direction, wherein at least two of the plurality of directions each corresponds to a respective different threshold; and
    reporting a request for lighting up the spot in the hot zone, in response to that a coverage of the signal exceeds the threshold.

2. The unlocking processing method according to claim 1, wherein a sensor configured to acquire the signal is provided under the hot zone, and the sensor comprises N sensing nodes, each corresponding to a respective sensing region, N being a positive integer.

3. The unlocking processing method according to claim 2, further comprising:
    setting a weight for each of the sensing nodes, wherein at least two of the sensing nodes each corresponds to a respective different weight.

4. The unlocking processing method according to claim 3, wherein among the N sensing nodes, a sensing node closer to a center of the hot zone for the spot has a greater weight.

5. The unlocking processing method according to claim 3, wherein the coverage is a weight ratio, and the reporting the request for lighting up the spot in the hot zone in response to that the coverage of the signal exceeds the threshold comprises:
    reporting the request for lighting up the spot in the hot zone, in response to that a ratio of a sum of weights of M sensing nodes, each generating a signal with an intensity greater than an intensity threshold, among the N sensing nodes to a reference weight corresponding to the direction exceeds a first threshold, where both N and M are positive integers, and M is less than N; or reporting the request for lighting up the spot in the hot zone, in response to that a ratio of a sum of weights of P sensing nodes, each generating a signal, among the N sensing nodes to the reference weight corresponding to the direction exceeds a second threshold, where P is a positive integer less than N and greater than or equal to M.

6. The unlocking processing method according to claim 3, wherein the coverage is an area ratio, and the reporting the request for lighting up the spot in the hot zone in response to that the coverage of the signal exceeding the threshold comprises:

reporting the request for lighting up the spot in the hot zone, in response to that a ratio of a sum of products of areas of sensing regions of M sensing nodes, each generating a signal with an intensity greater than an intensity threshold, among the N sensing nodes multiplied by respective weights to a reference area corresponding to the direction exceeds a third threshold, where both N and M are positive integers, and M is less than N; or reporting the request for lighting up the spot in the hot zone, in response to that a ratio of a sum of products of areas of sensing regions of P sensing nodes, each generating a signal, among the N sensing nodes multiplied by respective weights to the reference area corresponding to the direction exceeds a fourth threshold, where P is a positive integer less than N and greater than or equal to M.

7. A mobile terminal implementing the method of claim 1, comprising:

a display screen; and a sensor configured to acquire the signal under the hot zone, the sensor comprising N sensing nodes, each corresponding to a respective sensing region, N being a positive integer;

wherein the plurality of directions correspond to a plurality of different thresholds, thereby improving uniformity of unlocking speeds from the plurality of directions, and increasing success rate of fingerprint unlocking.

8. A terminal, comprising a processor, and memory configured to store executable instructions, wherein the processor is configured to:

in response to detecting a touch operation on a hot zone for a spot of the terminal, determine a direction of a signal generated by the touch operation among a plurality of directions, wherein the direction of the signal corresponds to a direction in which a fingerprint on display (FOD) spot is touched by a finger, and the plurality of directions comprise above, below, left and right;

determine a threshold according to the direction, wherein at least two of the plurality of directions each corresponds to a respective different threshold; and report a request for lighting up a spot in the hot zone, in response to that a coverage of the signal exceeds the threshold.

9. The terminal according to claim 8, wherein a sensor configured to acquire the signal is provided under the hot zone, and the sensor comprises N sensing nodes, each corresponding to a sensing region, N being a positive integer.

10. The terminal according to claim 9, wherein the processor is further configured to:

set a weight for each of the sensing nodes, wherein at least two of the sensing nodes each corresponds to a respective different weight.

11. The terminal according to claim 10, wherein among the N sensing nodes, a sensing node closer to a center of the hot zone for the spot has a greater weight.

12. The terminal according to claim 10, wherein the coverage is a weight ratio, and in reporting the request for lighting up the spot in the hot zone in response to that the coverage of the signal exceeds the threshold, the processor is configured to:

report the request for lighting up the spot in the hot zone, in response to that a ratio of a sum of weights of M sensing nodes, each generating a signal with an intensity greater than an intensity threshold, among the N sensing nodes to a reference weight corresponding to the direction exceeds a first threshold, where both N and M are positive integers, and M is less than N; or report the request for lighting up the spot in the hot zone, in response to that a ratio of a sum of weights of P sensing nodes, each generating a signal, among the N sensing nodes to the reference weight corresponding to the direction exceeds a second threshold, where P is a positive integer less than N and greater than or equal to M.

13. The terminal according to claim 10, wherein the coverage is an area ratio, and in reporting the request for lighting up the spot in the hot zone in response to that the coverage of the signal exceeding the threshold, the processor is configured to:

report the request for lighting up the spot in the hot zone, in response to that a ratio of a sum of products of areas of sensing regions of M sensing nodes, each generating a signal with an intensity greater than an intensity threshold, among the N sensing nodes multiplied by respective weights to a reference area corresponding to the direction exceeds a third threshold, where both N and M are positive integers, and M is less than N; or report the request for lighting up the spot in the hot zone, in response to that a ratio of a sum of products of areas of sensing regions of P sensing nodes, each generating a signal, among the N sensing nodes multiplied by respective weights to the reference area corresponding to the direction exceeds a fourth threshold, where P is a positive integer less than N and greater than or equal to M.

14. A non-transitory computer storage medium with executable instructions stored thereon, wherein the executable instructions, when executed by a processor, cause the processor to perform an unlocking processing method, the method comprising:

in response to detecting a touch operation on a hot zone for a spot of a terminal, determining a direction of a signal generated by the touch operation among a plurality of directions, wherein the direction of the signal corresponds to a direction in which a fingerprint on display (FOD) spot is touched by a finger, and the plurality of directions comprise above, below, left and right;

determining a threshold according to the direction, wherein at least two of the plurality of directions each corresponds to a respective different threshold; and reporting a request for lighting up the spot in the hot zone, in response to that a coverage of the signal exceeds the threshold.

15. The non-transitory computer storage medium according to claim 14, wherein a sensor configured to acquire the signal is provided under the hot zone, and the sensor comprises N sensing nodes, each corresponding to a respective sensing region, N being a positive integer, and the method further comprises:
setting a weight for each of the sensing nodes, wherein at least two of the sensing nodes each corresponds to a respective different weight.

16. The non-transitory computer storage medium according to claim 15, wherein among the N sensing nodes, a sensing node closer to a center of the hot zone for the spot has a greater weight.

17. The non-transitory computer storage medium according to claim 15, wherein the coverage is a weight ratio, and the reporting the request for lighting up the spot in the hot zone in response to that the coverage of the signal exceeds the threshold comprises:
reporting the request for lighting up the spot in the hot zone, in response to that a ratio of a sum of weights of M sensing nodes, each generating a signal with an intensity greater than an intensity threshold, among the N sensing nodes to a reference weight corresponding to the direction exceeds a first threshold, where both N and M are positive integers, and M is less than N.

18. The non-transitory computer storage medium according to claim 15, wherein the coverage is a weight ratio, and reporting the request for lighting up the spot in the hot zone in response to that the coverage of the signal exceeds the threshold comprises:
reporting the request for lighting up the spot in the hot zone, in response to that a ratio of a sum of weights of P sensing nodes, each generating a signal, among the N sensing nodes to a reference weight corresponding to the direction exceeds a second threshold, where P is a positive integer less than N and greater than or equal to M, and M is a number of sensing nodes, each generating a signal with an intensity greater than an intensity threshold, among the N sensing nodes.

19. The non-transitory computer storage medium according to claim 15, wherein the coverage is an area ratio, and the reporting the request for lighting up the spot in the hot zone in response to that the coverage of the signal exceeding the threshold comprises:
reporting the request for lighting up the spot in the hot zone, in response to that a ratio of a sum of products of areas of sensing regions of M sensing nodes, each generating a signal with an intensity greater than an intensity threshold, among the N sensing nodes multiplied by respective weights to a reference area corresponding to the direction exceeds a third threshold, where both N and M are positive integers, and M is less than N.

20. The non-transitory computer storage medium according to claim 15, wherein the coverage is an area ratio, and the reporting the request for lighting up the spot in the hot zone in response to that the coverage of the signal exceeding the threshold comprises:
reporting the request for lighting up the spot in the hot zone, in response to that a ratio of a sum of products of areas of sensing regions of P sensing nodes, each generating a signal, among the N sensing nodes multiplied by respective weights to a reference area corresponding to the direction exceeds a fourth threshold, where P is a positive integer less than N and greater than or equal to M, and M is a number of sensing nodes, each generating a signal with an intensity greater than an intensity threshold, among the N sensing nodes.

* * * * *